| United States Patent [19] | [11] Patent Number: 4,776,936 |
|---|---|
| Smith et al. | [45] Date of Patent: Oct. 11, 1988 |

[54] PROCESS FOR INCREASING THE SELECTIVITY OF ANISOTROPIC GAS SEPARATION MEMBRANES

[75] Inventors: James K. Smith, Slidell; Stephen C. Lynch, New Orleans; John W. McTopy, II, LaPlace, all of La.

[73] Assignee: Gulf South Research Institute, Baton Rouge, La.

[21] Appl. No.: 861,549

[22] Filed: May 9, 1986

[51] Int. Cl.$^4$ .............................. B01J 19/08
[52] U.S. Cl. ..................... 204/157.15; 204/157.6; 55/16; 55/158; 264/22; 264/25
[58] Field of Search ............... 55/16, 158; 264/22, 264/25, 26; 204/157.15, 157.6

[56] References Cited

U.S. PATENT DOCUMENTS

| 3,133,132 | 5/1964 | Loeb et al. ........................... 264/49 |
| 3,615,024 | 10/1971 | Michaels ............................ 210/490 |
| 3,648,845 | 3/1972 | Riley .................................. 210/490 |
| 3,864,289 | 2/1975 | Rendall ................................ 260/15 |
| 4,046,843 | 9/1977 | Sano et al. ............................ 264/22 |
| 4,230,463 | 10/1980 | Henis et al. ............................ 55/16 |
| 4,430,278 | 2/1984 | Jones, Sr. ............................. 264/22 |
| 4,472,175 | 9/1984 | Malon et al. ........................... 55/16 |
| 4,483,901 | 11/1984 | Okita et al. ........................ 428/315.5 |
| 4,486,202 | 12/1984 | Malon et al. .......................... 55/158 |
| 4,493,714 | 1/1985 | Ueda et al. ............................. 55/16 |

OTHER PUBLICATIONS

Cheng H. Lee, "Permeation Properties in Laminated Membranes", Separation Science, 9(6) pp. 479-485 1974.

*Primary Examiner*—John F. Niebling
*Assistant Examiner*—Ben C. Hsing
*Attorney, Agent, or Firm*—Arnold, White & Durkee

[57] ABSTRACT

Anisotropic gas separation membranes are treated to alter the microporosity of their thin, dense layer or composite coating—the layer or coating which provides selectivity in separations employing such membranes. The treatment increases the selectivity of a membrane with minimal decrease in its flux. The process comprises applying a polar activator to the membrane followed by exposing the membrane to microwave frequency radiation for a period of time sufficient to compact the thin layer of the membrane. The polar activator may be incorporated in the membrane during fabrication or applied as an after-treatment.

5 Claims, No Drawings

PROCESS FOR INCREASING THE SELECTIVITY OF ANISOTROPIC GAS SEPARATION MEMBRANES

BACKGROUND OF THE INVENTION

This invention pertains to membranes used for preferentially concentrating one or more gases from a mixture of gases. More particularly, the invention is applicable to anisotropic membranes, sometimes referred to as composite, or asymmetric membranes. The invention especially concerns a treatment process for controlling the microporosity of the thin, dense layer or composite coating of anisotropic membranes. This layer or coating provides selectivity in separations employing such membranes.

Selective separation to upgrade the concentration of one or more gases in a gaseous mixture is especially important in chemical processing, tertiary oil recovery, and gas purification processes. To be commercially attractive in such processes, membrane systems should be capable of withstanding typical separation operating conditions; they should provide an adequate separation of one or more of the gases in the mixture; and they should exhibit a sufficiently high flux (permeation rate per unit area).

The parameters of interest for separation membranes include selectivity and flux. The greater the selectivity, the greater the degree of separation which may be accomplished using the membrane. The higher the flux, the greater the quantity of gas permeate which may be obtained per unit time. In the past, most membranes which have been highly selective have had dense or compact structures which result in undesirably low fluxes. Correspondingly, those membranes which have exhibited high flux rates have had poor selectivity. It has, therefore, been a continuing objective in the art to develop improved membranes which will adequately separate one or more desired gases in a mixture while at the same time provide a sufficiently high flux to be commercially and economically attractive.

Early work with membranes for liquid separations centered around dense or compact, pore-free membranes with no direct fluid communication between surfaces of the membrane. Separation across such membranes obtains by solvent diffusion through the membrane structure. Such diffusive membranes offer high selectivity; however, their rates of diffusion are so low that they have limited utility. It was has been recognized that if such diffusive membranes could be fabricated in extremely thin form, the diffusion path could be short enough to provide acceptable flux rates. To achieve such flux rates, however, the diffusion path must be reduced to less than about $10^{-4}$ cm.

As the thickness of a membrane is reduced its mechanical strength is also reduced. Ultrathin membranes, theoretically possessing attractive flux rates, generally do not have the mechanical strength necessary to withstand the differential pressures necessary to realize those flux rates. This problem was addressed some years ago by composite membranes, also called anisotropic or asymmetric membranes. Loeb et al., U.S. Pat. No. 3,133,132, for example, describes a procedure for preparing a cellulose acetate composite membrane which consists of an ultrathin, microporous layer supported on a significantly more porous substrate. In time, this technology was extended to membranes formed from acrylonitrile, polysulfone, and polyvinyl chloride (see, for example, U.S. Pat. Nos. 3,526,588 and 3,615,024). The supporting substrate of such composite structures is formed with as high a porosity as possible in order to reduce the hydraulic resistance of the membrane. Ideally, the porosity of the support layer will be such that its contribution to the total resistance of the membrane system is negligible compared to that of the ultrathin separation layer.

A problem frequently encountered in separation operations with anisotropic membranes is the presence or formation of "pin holes"—pores within the ultrathin separation layer of the composite membrane. One operational approach to minimizing this problem in liquid solute/solvent separations has been to add a soluble polymer (e.g., a polyacrylic acid) to the recirculating feed. It is thought that the soluble polymer plugs the pin holes and thereby maintains the performance of the membrane.

For gas separations, membrane defects are a far greater problem. The presence of small pores in a membrane used for a liquid phase separation may not significantly affect its performance due to the much greater viscosity of liquids as compared to gases, and also due to such phenomena as solvent absorption and swelling of the membrane. These properties, however, differ by orders of magnitude in the case of gases. Since gases will readily pass through pores in a membrane, little, if any, separation will result if the membrane contains defects. Because gases generally have lower solubilities in membranes than liquids, an adequate flux can be achieved only with the thinnest possible separation membranes. The problems inherent in preparing defect-free ultrathin membranes increase exponentially as their thickness is reduced.

Chemical treatments with solvents or swelling agents and/or annealing have been practiced to reduce pores in gas separation membranes. In these procedures, one surface of a membrane is treated with a solvent or swelling agent to increase the density of the surface layer and thereby reduce the number of pores. The decrease in porosity increases the selectivity; however, the procedure usually results in a substantial decrease in flux.

Several techniques have also been suggested for sealing or plugging pin holes in composite membranes. Browall, U.S. Pat. No. 3,980,456, describes a composite membrane in which breaches or pin holes are sealed by applying a preformed organopolysiloxanepolycarbonate. Henis et al., U.S. Pat. No. 4,230,463, describes a process for coating an anisotropic membrane to plug any pores in the ultrathin dense layer.

Coating of the dense layer, however, may adversely affect total separation. The separation factor of a laminated membrane for any type of permeating molecule will lie somewhere between the maximum and minimum separation factors of the component membranes. (C. H. Lee, Permeation Properties in Laminated Membranes, *Separation Science*, 9, pp. 479–485, 1974) The effect of lamination on total membrane performance becomes more critical if one of the components changes permeating properties with gas concentration. The Henis et al. patent, mentioned earlier, attempts to circumvent such problems by selecting a rubber or liquid coating material with a transport rate greater by an order of magnitude than the polymer in the base membranes. Although this approach may reduce certain adverse effects of coating, it restricts the selection of coating polymers. Moreover, because of the physical state of such polymers (above their glass transition temperature), their long-term utility in processes requiring high temperatures and pressures is questionable.

SUMMARY OF THE INVENTION

The present invention comprises a process for treating anisotropic membranes and also hollow fibers which are used for preferentially concentrating one or more gases in a mixture of gases. The treatment increases the selectivity of a membrane or a hollow fiber with minimal decrease in its flux. The process comprises applying a polar activator to the membrane, followed by exposing the membrane to microwave frequency radiation for a period of time sufficient to compact the thin layer of the membrane. Polar activators are materials which, in a specific microwave field, effect a preferential increase in heating. The polar activator may be incorporated in the membrane during fabrication; it may be applied in the final drying step of membrane preparation; or it may be applied as an after treatment to the fabricated membrane.

The membranes treated by the present process have particular utility in gaseous separations involved in air enrichment, in hydrogen recovery, and in enhanced oil recovery. The gases of interest in such separations typically include: hydrogen, nitrogen, carbon dioxide, carbon monoxide, hydrogen sulfide, water vapor, and alkanes with one to four carbon atoms.

DETAILED DESCRIPTION OF THE EMBODIMENT

A key feature of the process lies in the microwave treatment of a multicomponent or composite membrane. The microwave treatment results in a compaction of the ultrathin dense layer of the separation membrane. Although not wishing to be held to any particular theory, it is believed that this compaction results from selective, rapid heating of the ultrathin dense layer. Such heating is accomplished when the ultrathin layer of the membrane, or an additive within or adsorbed onto that layer, absorbs microwave frequency radiation.

One advantage of microwave heating is the ability of microwaves to penetrate the surface of a membrane and thus heat all portions of the ultrathin layer nearly simultaneously. This results in more rapid heating than could be achieved by conventional thermal methods and allows a more thorough and uniform heating even of irregularly shaped objects. The degree to which a material is heated by microwave frequency radiation is determined primarily by its polarizability and dielectric loss factor. More polar materials with high loss factors are heated more rapidly than less polar substances (i.e. substances with a lower dipole moment). These more polar materials are polar activators, and their addition to one layer of a multicomponent membrane will effect a preferential increase in the heating rate of that layer when exposed to microwave frequency radiation.

It appears that many factors affect the uniformity of heating in a polar polymeric substance. These factors include the polymer itself, as well as fillers, processing aids, pigments, catalysts, plasticizers, stabilizers, and other additives. However, the major factor is the overall polarity of the substance. Many polymers are inherently polar and readily absorb microwave energy; however, it is often necessary to adjust the absorption rate by incorporating additives. Overall polarity can be increased by incorporating such polar activators as water, amines, and glycols into the final composition.

The total microwave energy absorbed by a material depends upon its loss factor, the frequency of the microwaves, the applied field strength, and the exposure time. The loss factor is a function of the dielectric constant of the material and the loss tangent. Loss tangent is a measure of the efficiency of absorption and is specific for a dipole, its field, and medium. It may be varied by polar activation additives which change the average dielectric constant loss factor. While many of the monomers used to produce the polymers of membrane systems are polar, their response to microwave radiation is slow or negligible when present in a highly ordered polymer structure. Many polar materials, including amines, alcohols, and esters, can be used as activation additives to enhance the absorption of the microwave energy.

Several phenomena may be occurring in this process. For example, repeated exposure of a polymer to a solvent will lead to some swelling and/or plastication which can relax the polymer structure. It is contemplated that this relaxed structure may undergo structural change more easily when exposed to microwave radiation.

Incorporation of polar activators also provides a mechanism for the establishment of frictional forces and a rapid increase in temperature. Either manifestation of energy can perform useful work resulting in increased density. As the ultrathin separation layer is rapidly heated, the polar activator is vaporized and removed from the polymer matrix. This can result in a densification of the surface related to the surface tension of the solvent. The above possible explanations of the success of the present invention are not intended to be limiting; other phenomena may be occurring. In any case, the successful practice of the invention depends on applying the activator to the ultrathin dense layer, and more specifically, applying it preferentially to areas such as pores, where "healing" is required.

The asymmetric dense layer of a composite membrane will absorb a polar activator during controlled exposure to a gas stream containing the activator. The depth and degree of absorption in the ultrathin dense layer is regulated primarily by diffusion into the matrix of the separation layer, the concentration of the activator in the gas stream, and the length of exposure. Diffusion into the dense layer will be relatively slow; however, its distribution will be relatively rapid into pores that penetrate the anisotropic membrane surface. The higher concentration of the polar activator in the pore structure results in a more intense treatment of that locality when microwave energy is applied. Preferential treatment of pore structure, as compared to the total membrane surface, results in improved separations through elimination of defects with limited reduction in flux due to total surface densification.

The frequency of the microwave radiation used in the process may be varied as desired to optimize absorption by the activator or the treated membrane surface. It is recognized that several ranges of frequencies have been approved by the government for uses such as herein disclosed. In that regard, it has been found that microwave radiation of about 2450 megahertz will suffice for the majority of membrane formulations and polar activators applicable to the process disclosed herein. This frequency falls within the frequency range 2400 to 2500 MHz which is one of the government-approved ranges.

An anisotropic membrane to be treated is exposed to a polar activator, preferably on the dense layer side, either in the liquid phase or in the gas phase. For application purposes, the activator may be dissolved in an appropriate solvent or carrier gas. The exposure time of the membrane to the activator will depend on the concentration of the polar activating agent, the affinity of the activator for the membrane, and the flow rate of the fluid containing the activating agent across the membrane surface. Preferably, the exposure time will be less than that required for equilibration of the activator in the membrane. At ambient temperatures and pressures the exposure time will generally be less than about 10 minutes. Although not wishing to be held to any particular theory, it is contemplated that, depending on the particular activator and membrane polymer involved, the activator may associate with the dense layer of the membrane either by a process akin to the dissolution of a solute whereby the activator is predominately within the polymer structure of the dense layer or by physical adsorption on the surface of the dense layer.

Alternatively, polar activating agents such as water, amines, and/or glycols may be incorporated in the initial membrane formulation, or they may be applied in a vapor phase treatment during the final drying step of membrane fabrication. Membranes which can benefit from the application of the present invention will generally be formed from polymers with a glass transition temperature ($T_g$) of less than about 400 degrees Celsius.

It will be understood that the anisotropic gas separation membranes to which this process applies may be fabricated in a variety of forms. The invention, for example, is applicable to membranes in the form of hollow fibers. Moreover, the process may be utilized for such hollow fiber separators even after they have been encapsulated in tube-and-shell permeators.

Following application of the polar activator the membrane may be immediately treated with microwave radiation or, especially if the activating agent is applied in a liquid solution, the membrane may first be drained and/or flushed with a gas to remove excess solution. The exposure time of the microwave treatment will depend upon the particular activating agent, its concentration on or in the membrane, and the power level of the microwave generator. For most membranes and activators, a 700-watt exposure will effectively treat the membrane system in less than about 5 minutes. It is important that the membrane not be damaged by exposing it to microwave energy sufficient to initiate pyrolysis of the composite structure. The membrane will be ready for immediate use when the microwave treatment is complete.

The nature of the invention will be better understood by reference to the following examples.

EXAMPLE 1

A polyimide asymmetric hollow fiber encapsulated in a tube and shell gas permeator was purged for 15 seconds on the shell side (i.e., the dense layer side) with low pressure steam at approximately 105 degrees Celsius. The permeator was immediately placed in a microwave oven and treated for one minute with 700 watts of microwave radiation at a nominal frequency of 2450 MHz. The permeator was removed from the oven and evaluated for improvements in the separation of a one-to-one mixture of carbon dioxide and methane. Prior to treatment, the permeator had exhibited a separation factor of 0.9. Separation factor is defined as the quotient obtained by dividing the mole ratio of gases of interest in the permeate by that same ratio which characterizes the feed gas. Thus, the separation factor is $$\frac{CO_2:CH_4 \text{(permeate)}}{CO_2:CH_4 \text{(feed)}} = 0.9 \text{ in the present example.}$$

After the treatment, the separation factor improved to 44. The initial separation factor of 0.9 indicates that the bulk of the transport across the membrane was occurring through pores. Thus, if these pores were to be effectively sealed by this process, a corresponding decrease in permeability (flux) across the membrane was expected to be observed. This proved to be the case. The permeability (flux) prior to application of the treatment process was $1.3 \times 10^{-5}$ mL/cm$^2$-sec-cmHg, and it was reduced by the treatment to $0.4 \times 10^{-6}$. A control permeator which was treated by the same process but excluding the steam purge, showed no chang in separation factor or flux. An additional control permeator was purged with steam and then dried using an air sweep at 20 degrees Celsius (i.e., not exposed to microwave radiation). It was found that this control did not exhibit an increase in selectivity (i.e., the separation factor remained unchanged), but did suffer a major reduction in flux.

EXAMPLE 2

A polyimide asymmetric membrane was purged with a tetrahydrofuran-saturated nitrogen stream for two minutes and thereafter exposed to 700 watts of microwave radiation at 2450 MHz for one minute. Prior to treatment the membrane permeator had exhibited a separation factor of 0.88 and a flux value of $1.2 \times 10^{-5}$ for a mixture of carbon dioxide and methane. Following the treatment process the separation factor was 33 and the flux value was $0.9 \times 10^{-6}$.

A membrane treated the same way but without the tetrahydrofuran purge showed no change in separation factor or flux value. A membrane exposed to the tetrahydrofuran purge but air-dried without exposure to microwaves exhibited a major reduction in flux but without an increase in separation factor.

EXAMPLE 3

An asymmetric, polysulfone, hollow fiber permeator was flushed for two minutes on the shell side—dense layer side of the asymmetric membrane—with a 5% solution of polyvinylpyrrolidone in methanol. The system was drained; air-purged for 2 minutes to remove excess activating solution; and exposed to microwaves at a frequency of 2450 MHz for one minute. Prior to treatment, the polysulfone unit had exhibited a separation factor of 0.9 for a carbon dioxide/methane mixture and a flux value of $8.3 \times 10^{-5}$. Following treatment, the separation factor improved to 3.0 with a permeability of $1.6 \times 10^{-5}$. Microwave treatment alone induced no changes. The solution treatment followed by air drying but without microwave exposure did not improve selectivity (separation factor was unchanged), but did reduce the flux value by an order of magnitude.

EXAMPLE 4

A polyamide, asymmetric, hollow fiber permeator was purged for one minute with a nitrogen gas stream saturated with formaldehyde vapor. The unit was then immediately exposed to 560 watts of microwave radiation at 2450 MHz for 1.5 minutes. Prior to this treatment, the unit had exhibited a separation factor of 14 and a mixed gas permeability value of $19 \times 10^{-6}$ for a gas mixture consisting of 20% hydrogen and 80% methane. Following the treatment procedure, the separation factor was 33 and the permeability value (flux) was $8 \times 10^{-6}$. Similar units, purged with the formaldehyde activator but not microwave treated or microwaved but not activated with formaldehyde, exhibited no change in their separation factors or flux values.

EXAMPLE 5

One milliliter of Freon 113 was placed in the shell side (dense layer side) of a polyamide, asymmetric, hollow fiber permeator. The unit was then exposed to 700 watts of microwave radiation at 2450 MHz for 100 seconds. Prior to this treatment the unit had exhibited a separation factor of 10 with a mixed gas permeability value of $19 \times 10^{-6}$ on a mixture comprising 20% hydrogen and 80% methane. Following treatment the separation factor was 27 and the permeability (flux) value was $14 \times 10^{-6}$. Similar permeators treated with Freon 113 alone (no microwave exposure) or microwave-treated without Freon 113 activation exhibited no change in either separation values or flux values.

EXAMPLE 6

A dry, flat sheet, asymmetric, cellulose acetate membrane was swept with humid air for 7 minutes at a flow rate of 50 mL/min. The membrane was then immediately exposed to 700 watts of microwave energy at 2450 MHz for 45 seconds. Prior to this treatment the membrane had exhibited a separation factor of 2.7 and a mixed gas permeability value of $53.5 \times 10^{-6}$ on a 20% hydrogen—80% methane gas mixture. Following treatment the separation factor was found to be 5.1 with an unexpected increase in the permeability value to $80.9 \times 10^{-6}$.

No change in either flux value or separation factor was observed when a similar dry membrane was exposed to the same microwave treatment. Exposing a dry membrane to humid air in the same manner as described above but followed by air drying rather than microwave exposure did not improve the separation factor, but was found to reduce the flux.

EXAMPLE 7

A dry, flat sheet, asymmetric, cellulose acetate membrane was swept with humid air for 20 minutes at a flow rate of 50 mL/min. The membrane was then exposed to 560 watts of microwave energy at 2450 MHz for one minute. Five minutes later, the microwave treatment was repeated. Prior to this treatment, a separation factor of 7 was observed for a gas mixture comprising 20% hydrogen and 80% methane. Following treatment the separation factor was 12.3. The methane permeability value of $12 \times 10^{-6}$ was unaffected by the treatment. However, the hydrogen permeability value increased from $81 \times 10^{-6}$ to $150 \times 10^{-6}$.

No change in either flux value or separation factor was observed when a similar dry membrane was exposed to the same microwave treatment. Exposing a dry membrane to humid air in the same manner as described above but followed by air drying rather than microwave exposure did not improve the separation factor, but was found to reduce the flux.

The foregoing description of the several embodiments of this invention is not intended to be limiting. As will be apparent to those skilled in the art, the inventive concepts set forth herein can find many applications in the art of membrane gas separations, and many variations an modifications of the embodiments described above may be made without departing from the spirit and scope of this invention.

We claim:

1. A process for increasing the relative concentration of one or more gases in a gas mixture, which comprises:
   (a) adding a polar activator to an anisotropic gas separation membrane;
   (b) exposing the membrane containing the polar activator to microwave radiation;
   (c) exposing a first gas mixture to one side of the membrane;
   (d) producing a second gas mixture by the selective diffusion of gases from the first gas mixture through the membrane; and,
   (e) collecting the second gas mixture from the opposite side of the membrane.

2. A process as recited in claim 1 wherein the first gas mixture includes a gas selected from the group consisting of: hydrogen, nitrogen, carbon dioxide, carbon monoxide, hydrogen sulfide, water vapor, and alkanes with one to four carbon atoms.

3. A process as recited in claim 1 wherein the first gas mixture comprises carbon dioxide and methane.

4. A process as recited in claim 1 wherein the first gas mixture comprises hydrogen and methane.

5. A process for treating an anisotropic gas separation membrane to increase its selectivity by altering the microporosity of an ultrathin, dense layer of the membrane, which comprises:
   (a) applying a polar compound to the ultrathin, dense layer of the composite membrane by exposing the dense layer to a gas stream comprising an inert carrier gas and the vapor phase polar compound at a temperature above the condensation point of the polar compound and below the glass transition temperature of any polymer from which the membrane was fabricated for a period of time less than that necessary to establish equilibration between the polar compound in the vapor phase and the polar compound in or on the ultrathin, dense layer of the composite membrane; and,
   (b) heating the membrane, activated by the addition of the polar compound, using microwave radiation at a nominal frequency of 2450 megahertz for a period of more than about 5 seconds and less than about 300 seconds and less than that period sufficient to initiate pyrolysis in a composite membrane of the same formulation but without the addition of the polar compound.

* * * * *